United States Patent Office 3,816,438
Patented June 11, 1974

3,816,438
2H[1]-BENZOTHIEPINO[5,4-c]-PYRAZOLES AND [1]-BENZOTHIOPYRANO[4,3-c]-PYRAZOLES
William J. Houlihan, Mountain Lakes, N.J., assignor to Sandoz-Wander, Inc., Hanover, N.J.
No Drawing. Filed Dec. 22, 1972, Ser. No. 317,544
Int. Cl. C07d 31/50
U.S. Cl. 260—294.8 B          5 Claims

ABSTRACT OF THE DISCLOSURE

Fused heterocyclic pyrazoles, e.g., 4,5 - dihydro-3-(4-pyridyl)-2H[1]-benzothiepino[5,4-c]-pyrazole, are useful as non-estrogenic antifertility agents.

---

This invention relates to fused heterocyclic pyrazole derivatives containing an oxygen or sulfur hetero atom. More particularly it relates to 3-phenyl and 3-pyridyl derivatives of fused pyrazole compounds and their use in pharmaceutical compositions.

The compounds of this invention may be represented by the following formula:

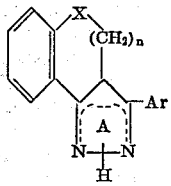

where
$n$ is 1 or 2
X is oxygen or sulfur and
Ar is

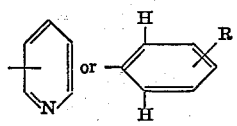

where $R_1$ represents halo having an atomic weight of about 19 to 36,
and pharmaceutically acceptable acid addition salts thereof, The diaza ring (A) in the compounds of formula (I) can have the following structures:

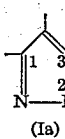 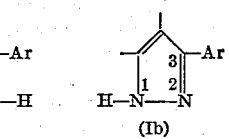 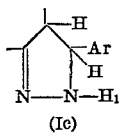

(Ia)         (Ib)         (Ic)

It should be noted that the compounds of structures (Ia) and (Ib) are considered equivalent and are known to exist in both tautomeric forms. It should also be noted that this invention includes the geometrical and optical isomers of the compounds of structures (Ic).

The compounds of formulas (Ia) and (Ib) can be prepared by the following reaction from the compounds of formula (Ic):

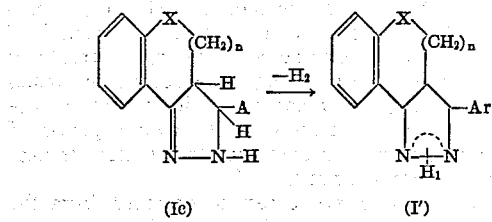

where $n$, X and Ar are as set out above.

The compounds of formula (I') are prepared by dehydrogenating a compound of formula (Ic). The dehydrogenation can be carried out by exposing compound (Ic) to air or oxygen for example on a chromatographic media such as silica or alumina. The process may be carried out by dissolving the compound (Ic) in an inert solvent, chromatographing on silica or alumina and eluting with an inert solvent. The particular inert solvent used is not critical and can be lower alkanols, i.e., alkanols having 1 to 4 carbon atoms, aliphatic or aromatic hydrocarbon, halogenated hydrocarbons, straight chain ethers or cyclic ethers. The temperature of the reaction is not critical, but the reaction is normally carried out between 15 to 35° C., preferably 20 to 30° C.

Alternatively, the reaction may be carried out in the presence of a dehydrogenating agent such as sulfur or palladium or an oxidizing agent such as manganese dioxide. Although a solvent is not essential in the reaction and the temperature is not critical, it is preferred that an inert solvent be used and that the reaction be carried out between temperatures of 20 to 250° C. When sulfur or palladium is used as the dehydrogenation agent, the preferred solvents are Decalin, xylene, naphthalene and the like and the preferred temperature is 200 to 250° C. With manganese dioxide, the preferred solvent is benzene, toluene and the like, and the preferred temperature is 20 to 50° C. It is preferred that the reaction be run for 5 to 50 hours, especially from 5 to 25 hours. The products are recovered by conventional techniques, e.g., evaporation and recrystallization.

The compounds of formula (Ic) are prepared by the following reaction scheme:

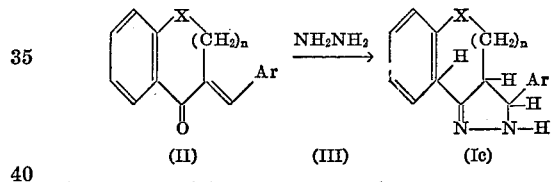

where $n$, X and Ar are as set out above.

The compounds of formula (Ic) are prepared by treating a compound of formula (II) with hydrazine of formula (III). Although a solvent is not necessary, it is preferred that the reaction be carried out in an inert solvent such as lower alkanols, aliphatic or aromatic hydrocarbons, halogenated hydrocarbons, straight chain ethers or cyclic ethers. The particular solvent used is not critical but the preferred solvents are the lower alkanols such as methanol, ethanol, butanol and the like. The temperature of the reaction is not critical, but it is normally carried out between 35° and 150° C., preferably at the reflux temperature of the system. It is also preferred that the reaction be run for from 8 hours to 5 days under anhydrous conditions. When the preceeding reaction is carried out in an inert atmosphere, such as helium, argon or nitrogen, the compound with structure (Ic) is predominantly obtained and is isolated by conventional techniques.

The compounds of formulas (Ia) and (Ib) may also be prepared by the following reaction scheme:

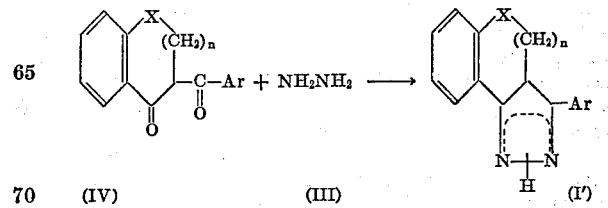

where $n$, X and Ar are as set out above.

The compounds of formula (I') are prepared by treating a compound of the formula (IV) with hydrazine of the formula (III). Although a solvent is not necessary, it is preferred that the reaction be carried out in an inert solvent such as the lower alkanols, as defined above, ethers, e.g., diethyl ether, dioxane or tetrahydrofuran, halogenated hydrocarbons such as chloroform, or in excess hydrazine of formula (III). The temperature of the reaction is not critical, but the reaction is preferably run at between 30° to 150° C., especially at the reflux temperature of the reaction mixture. The product is isolated by standard techniques, e.g., recrystallization.

The compounds of formula (I) in which ring A has the structure (Ia) and (Ib) may also be prepared by the following reaction scheme:

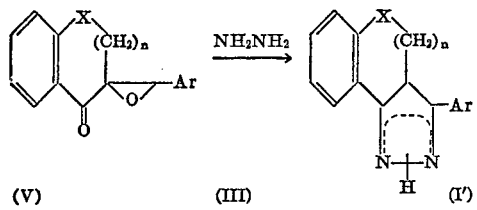

where n, X and Ar are as defined above.

The compounds of formula (I') are prepared by treating a compound of formula (V) with hydrazine of formula (III). The reaction is preferably carried out under acidic catalysis which can be provided by a mineral acid such as hydrochloric acid, sulfuric acid, and the like, a strong organic acid such as p-toluenesulfonic acid or a Lewis acid such as boron trifluoride. The preferred acids are p-toluenesulfonic acid and boron trifluoride. Although a solvent is not required, it is preferred that the reaction be carried out in the presence of an inert solvent such as the lower alkanols, aliphatic or aromatic hydrocarbons, halogenated hydrocarbons, straight chain ethers or cyclic ethers. The particular solvent used is not critical, but the lower alkanols, such as methanol, ethanol, butanol and the like are preferred. The temperature of the reaction also is not critical, but it is generally carried out between 35° and 200° C. preferably at the reflux temperature of the system. It is also preferred that the reaction be run for from 8 hours to 5 days. The product is recovered in the usual manner, e.g., by evaporation and crystallization.

The compounds of formula (V) are prepared in accordance with the following reaction scheme:

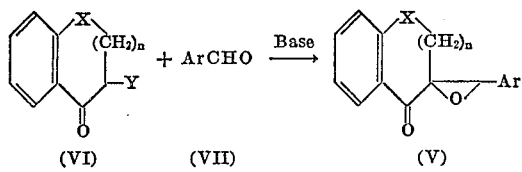

where

Y is a leaving group and
n, X and Ar are as set out above.

The compounds of formula (V) are prepared by treating the compounds of formula (VI) with the compounds of formula (VII) under basic conditions in an inert solvent. It is preferred that the reaction be run in an inert atmosphere such as argon, helium and especially nitrogen. The leaving group Y in formula (VI) can be any of the conventional leaving groups employed in such a reaction, such as chlorine, bromine, iodine, tosylate, mesylate and the like. The preferred leaving group is the halogens, especially chlorine or bromine. The basic conditions for the reaction are provided by alkali or alkali earth metal hydroxides, alkali metal lower alkoxides, tertiary aliphatic and aromatic amines and tertiary cyclic amines such as pyridine and the like. Although the particular solvent used is not critical, the lower alkanols such as methanol, ethanol, butanol, and the like are especially preferred, in particular, the lower alkanol corresponding to the alkali metal alkoxide when used. The temperature of the reaction is not critical, but it is generally carried out between 0° and 30°, preferably about 5° to 10° C. Although the time is not critical, it is preferred that the reaction be run for from 1 to 5 hours. The product is recovered by standard techniques e.g., by crystallization or distillation.

The compounds of formula (V) can also be prepared by the following reaction scheme:

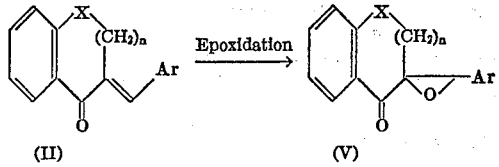

where n, X and Ar are as set out above.

The compounds of formula (V) are prepared by treating the compounds of formula (II) with an epoxidizing agent in an inert solvent. The epoxidizing agent used can be any of the standard epoxidizing agents used in epoxidizing $\alpha,\beta$-unsaturated ketones, e.g., hydrogen peroxide and bases such as the alkali metal hydroxides or alkoxides. The inert solvent can be water, lower alkanols, aliphatic or aromatic hydrocarbons, halogenated hydrocarbons, straight chain ethers, cyclic ethers, and the like depending on the solubility characteristics of the reactants, in particular, the epoxidizing agents. The preferred solvents are water and the lower alkanols such as methanol, ethanol, butanol, and the like. The temperature of the reaction is not critical, but it is normally carried out between 0° to 100° C., depending on the epoxidizing agent but preferably between 15° to 30° C. For optimum results it is preferred that the reaction be run from 3 hours to 2 days preferably 5 to 10 hours. The product is recovered in the usual manner e.g., by extraction and evaporation.

The compounds of formulas (II), and (VI) are prepared by well known procedures from compounds of the formula:

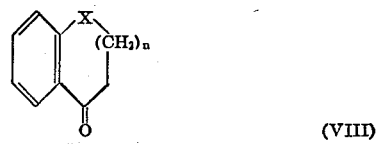

where n, R$_2$, R$_3$ and the proviso are as set out above.

The compounds of formula (II) are, for example, prepared by treating a compound of formula (VIII) with a compound of formula (VII). The process is suitably carried out by standard techniques, preferably in an inert solvent such as piperidine, and in the presence of a catalytic amount of a base such as sodium hydroxide, potassium hydroxide, diethylamine or triethylamine or in the presence of a catalytic amount of an acid such as hydrochloric acid, sulfuric acid, phosphoric acid, acetic acid, toluenesulfonic acid or methylsulfonic acid. The temperature of the reaction is 15 to 100°, usually 25 to 50° C., and the reaction is run for from 2 to 24 hours, normally 6 to 14 hours. The particular solvent, temperature or time used in the reaction is not critical.

The compounds of formula (VI) may be obtained by standard procedure from compounds of formula (VIII). For example, the chlorine or bromine substituted compounds can be prepared by treating the compound of formula (VIII) with chlorine or bromine, preferably in an inert solvent such as acetic acid, chloroform or carbon tetrachloride. The reaction can be carried out at temperatures from room temperature to 50° over a period of 1 to 12 hours. The particular solvent, temperature or time used in the reaction are not critical.

The tosylate and mesylate can be prepared from the chlorine or bromine substituted compound by treatment with a tosylate or mesylate salt, such as sodium or potassium tosylate or mesylate in an inert solvent such as lower alcohols, toluene or benzene. The reaction is preferably carried out at temperatures between 15 to 70° for a period of 2 to 10 hours. The particular solvent used, the temperature and the time in the reaction are not critical.

The hydrazine of formula (III) and many of the compounds of formulas (IV), (VII), and (VIII) are known and are prepared by procedures disclosed in the literature. The compounds of formulas (IV), (VII), and (VIII) not specifically disclosed in the literature may be prepared by analogous methods using known starting materials.

The compounds of formula (I) are useful because they possess pharmacological activity in animals. In particular, the compounds are useful as anti-fertility agents as indicated by their activity in female Wistar rats which are injected daily with 2 mg. of the test compound for eight successive days starting on the day of vaginal cornification. At the time of the 4th injection, males of known fertility are cohabitated with the females (one female with one male) until the end of the treatment period. The males are separated from the females 24 hours following the last injection. The females are sacrificed six days later, and examined for the presence of absence of implantation sites.

The use of the compounds as anti-fertility agents is further indicated by their luteolytic properties which results in the compounds being abortifacient agents. The luteolytic activity is determined using pseudopregnant rabbits treated with corn oil or compound (1–100 mg. per day) suspended in corn oil on days 3 through 8 of pseudopregnancy. Blood samples are obtained daily throughout the length of pseudopregnancy. Plasma samples are analyzed for progestin content according to the method of Johansson et al. (Endocrinology 82, 143, 1968). The compound is judged active if plasma progestin levels are similar to pretreatment values on day 12 of pseudopregnancy.

Abortifacient activity is also determined in female proestrous rats (Royal Hart, Wistar strain) selected from a colony and caged with fertile males. On the following day pregnancy is confirmed by the presence of spermatozoa in the vaginal smear. On the seventh day following mating the females are treated with 1 to 30 milligrams of the compound to be tested. The animals are injected daily for a total of seven days; and on the eighth day following the first injection the animals are killed and the uterus checked for the presence of absence of implantation sites.

The compounds of formula (I), when used as anti-fertility agents, exhibit none of the estrogenic effects and side effects exhibited by the steroidal type compounds used for these purposes.

When the compounds are employed for the above utility, they may be combined with one or more pharmaceutically acceptable carriers or adjuvants, and may be administered orally in such forms as tablets, capsules, elixirs, suspensions and the like, bucally or sub-ligually as a tablet, parenterally in the form of an injectable solution or suspension or in special forms such as suppositories and the like especially pessaries. Depending upon the compound employed and the mode of administration the exact dosage utilized may vary.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of the acid addition salts are the mineral acid salts, such as the hydrochloride, hydrobromide, sulfate, phosphate and the like and the organic acid salts, such as the succinate, benzoate, acetate, p-toluenesulfonate, benzenesulfonate, and the like.

In general, satisfactory results are obtained when the compounds of formula (I) are administered as an antifertility agent at a daily dosage of about 1.0 milligrams to about 200 milligrams orally or subcutaneously per kilogram of animal body weight. This daily dosage is preferably administered 1 to 4 times a day or in sustained release form. For most large mammals, such as primates, the total daily dosage is from about 1 milligram to about 1 gram. Dosage forms suitable for internal use comprise from about 0.25 milligrams to about 0.5 grams of the active compound in intimate admixture with a solid or liquid pharmaceutically acceptable carrier or diluent.

A representative formulation suitable for oral administration 2 to 4 times a day in fertility control is a capsule prepared by standard encapsulating techniques which contain the following:

| Ingredients | Weight (mg.) |
|---|---|
| 4,5-dihydro-3-(4-pyridyl)-2H[1]-benzothiepino [5,4-c]-pyrazole | 25 |
| Inert solid diluent (starch, lactose, kaolin) | 275 |

EXAMPLE 1

4,5-dihydro-3-(4-pyridyl)-2H[1]-benzothiepino [5,4-c]-pyrazole

A solution of 64.26 grams (0.60 mole) of 4-pyridine carboxaldehyde, 89.12 grams (0.50 mole) of 2,3-dihydro-1-benzothiepin-5(4H)-one, 10 grams of piperidine and 10 grams of acetic acid are maintained at 60–70° for 2 hours and at 80° for 15 hours. The solution is cooled in an icebath and treated with about 200 ml. of acetone-pentane (1:1). The resultant precipitate is filtered off and the filtrate is stirred in a refrigerator for about 24 hours. The resultant solid is filtered off to give 2,3-dihydro-4-(4-pyridylmethylene)-1-benzothiepin-5(4H)-one (M.P. 102–106° from ethanol).

A mixture of 8.01 grams (0.03 mole) of 2,3-dihydro-4-(4-pyridylmethylene) - 1 - benzothiepin-5(4H)-one, 3.2 grams (0.10 mole) of 97% hydrazine and 75 ml. of ethanol is stirred and refluxed for 20 hours. The solvent is removed in vacuo, and the residue, 3-(4-pyridyl)-3,3a,4,5-tetrahydro-2H[1]-benzothiepino[5,4]pyrazole, is dissolved in chloroform and chromatographed on silica gel. The resulting 4,5-dihydro-3-(4-pyridyl)-2H[1]-benzothiepino[5,4-c]pyrazole is eluted with 90:10 $CHCl_3:CH_3OH$ solvent and has a melting point of 203–206° C. from ethanol.

The 4,5 - dihydro-3-(4-pyridyl)-2H[1]-benzothiepino [5,4-c]-pyrazole of this example is an effective fertility control agent when it is subcutaneously administered to an animal at a dosage of 50 milligrams four times a day.

When the above process is carried out and an equivalent amount of p-chlorobenzaldehyde is used in place of the 4-pyridine carboxaldehyde, there is obtained 2,3-dihydro-4-(b) 1,4-benzothiopyrone or
treatment with hydrazine and 4,5-dihydro-3-(p-chlorophenyl)-2H[1]-benzothiepino[5,4-c]-pyrazole after treatment with 97% hydrazine.

EXAMPLE 2

Following the process of example 1 but using an equivalent amount of (a) 1,4-benzopyrone,
(b) 1,-benzothiopyrone or
(c) 2,3-dihydro-1-benzoxepin-5(4H)-one in place of the 2,3-dihydro-1-benzothiepin-5(4H)-one used therein, there is obtained (a) 3-(4-pyridylmethylene)-1,4-benzopyrone,
(b) 3-(4-pyridylmethylene)-1,4-benzothiopyrone or
(c) 2,3-dihydro-4-(4-pyridylmethylene)-1-benzoxepin-5(4H)-one respectively before treatment with hydrazine and (a) 2,4-dihydro-3-(4-pyridyl)-[1]-benzopyrano[4,3-c]-pyrazole,
(b) 2,4-dihydro-3-(4-pyridyl)-[1]-benzothiopyrano-[4,3-c]-pyrazole or
(c) 4,5-dihydro-3-(4-pyridyl)-2H[1]-benzoxepino-[5,4-c]-pyrazole respectively after treatment with hydrazine.

EXAMPLE 3

When the process of example 1 is carried using equivalent amounts (a) 1,4-benzopyrone and p-chlorobenzaldehyde;
(b) 1,4-benzothiopyrone and p-chlorobenzaldehyde or
(c) 2,3-dihydro-1-benzoxepin-5(4H)-one and p-chlorobenzaldehyde in place of the 2,3-dihydro-1-benzothiepin-5(4H)-one and 4-pyridine carboxaldehyde used therein there is obtained (a) 3-(4-chlorobenzylidine)-1,4-benzopyrone
(b) 3-(4-chlorobenzylidine)-1,4-benzothiopyrone or
(c) 2,3-dihydro-4-(4-chlorobenzylidine)-1-benzoxepin-5(4H)-one respectively before treatment with hydrazine and (a) 2,4-dihydro-3-(4-chlorophenyl)-[1]-benzopyrano-[4,3-c]-pyrazole
(b) 2,4-dihydro-3-(4-chlorophenyl)-[1]-benzothiopyrano[4,3-c]-pyrazole or
(c) 4,5-dihydro-3-(4-chlorophenyl)-2H[1]-benzoxepino-[5,4-c]-pyrazole respectively after treatment with hydrazine.

EXAMPLE 4

4,5-dihydro-3-(4-pyridyl)-2H[1]-benzothiepino-[5,4-c]-pyrazole

Step A: 3'-(4-pyridyl)-spiro[2,3-dihydro-1-benzothiepine-4,2'-oxirane]-5(4H)-one.—To a stirred solution of 11.3 g. of 4-bromo-2,3-dihydro-1-benzothiepin-5(4H)-one and 5.5 g. of pyridine-4-carboxaldehyde in 20 ml. of methanol under nitrogen is added at 5° to 10° C. a solution of sodium methoxide in methanol (prepared by dissolving 1.15 g. of serum in 50 ml. methanol). After 2 hours, 3'-(4-pyridyl)-spiro[2,3-dihydro-1-benzothiepine-4,2'-oxirane]-5(4H)-one precipitates and is filtered off and recrystallized from methanol.

Step B: 4,5-dihydro-3-(4-pyridyl)-2H[1]-benzothiepino-[5,4-c]-pyrazole.—A mixture of 3 grams of the oxirane from Step A, 15 ml. of 98% hydrazine, 5 mg. p-toluenesulfonic acid and 15 ml. of n-butyl alcohol are refluxed together for 3 days. On cooling the mixture, 4,5-dihydro-3-(4-pyridyl)-2H[1]-benzothiepino[5,4-c]-pyrazole precipitates and is recovered by filtration (M.P. 203°–206° C.).

Following the above procedure but using (a) 3-bromo,1,4-benzopyrone
(b) 3-bromo-1,4-benzothiopyrone or
(c) 4-bromo-2,3-dihydro-1-benzothioxepin-5(4H)-one is used in place of the 4-bromo-2,3-dihydro-1-benzothiepine-5-(4H)-one, there is obtained (a) 3'-(4-pyridyl)-spiro[1-benzopyrane-3,2'-oxirane]-4-one,
(b) 3'-(4-pyridyl)-spiro[1-benzothiopyrane-3,2'-oxirane]-4-one;
(c) 3'-(4-pyridyl)-spiro[2,3-dihydro-1-benzoxepine-4,2'-oxirane]-5-one;

before treatment, with hydrazine and (a) 2,4-dihydro-3-(4-pyridyl)[1]-benzopyrano-[4,3-c]-pyrazole;
(b) 2,4-dihydro-3-(4-pyridyl)-[1]-benzothiopyrano-[4,3-c]-pyrazole;
(c) 4,5-dihydro-3-(4-pyridyl)-2H-[1]benzoxepino-[5,4-c]-pyrazole;

respectively after treatment with hydrazine.

EXAMPLE 5

4,5-dihydro-3-(4-pyridyl)-2H[1]-benzothiepino-[5,4-c]-pyrazole

A solution of 12.5 grams of 2,3-dihydro-4-isonicotinoyl-1-benzothiepin-5(4H)-one and 2 grams of hydrazine in 50 milliliters of ethanol is refluxed for 1 hours. The solution is then acidified with 100 milliliters of 1 N hydrochloric acid and extracted twice with 100 milliliters of methylene chloride. The aqueous solution is then made basic with sodium bicarbonate and extracted again with methylene chloride. The latter extracts are washed with water, dried and concentrated under vacuum. The 4,5-dihydro-3-(4-pyridyl)-2H[1] - benzothiepino[5,4 - c] - pyrazole which precipitates is recrystallized from ethanol (M.P. 203°–206° C.).

Following the above procedure but using an equivalent amount of (a) 3-isonicotinoyl-[1]-benzopyrano[4,3-c]-pyrazole
(b) 3-isonicotinoyl-[1]-benzothiopyrano[4,3-c]-pyrazole or
(c) 2,3-dihydro-4-isonicotinoyl-[1]-benzoxepino[4,5-c]-pyrazole in place of the 2,3-dihydro-4-isonicotinoyl-1-benzothiepino-5(4H)-one used therein there is obtained (a) 2,4-dihydro-3-(4-pyridyl)-[1]-benzopyrano[4,3-c]-pyrazole,
(b) 2,4-dihydro-3-(4-pyridyl)-[1]-benzothiopyrano-[4,3-c]-pyrazole or
(c) 4,5-dihydro-3-(4-pyridyl)-2H[1]-benzoxepino-[4,3-c]-pyrazole respectively.

EXAMPLE 6

4,5-dihydro-3-(4-pyridyl)-2H[1]-benzothiepino-[5,4-c]-pyrazole

To a mixture of 10 g. of 2,3-dihydro-4-(4-pyridylmethylene)-benzothiepin-5-[4H]-one prepared as in example 1 in 100 ml. of water and 200 ml. of ethanol is added sufficient chloroform to dissolve the reactants. The pH is adjusted to between 7 and 9 and a 3 molar excess of 30% hydrogen peroxide in water is added dropwise at room temperature. The reactants are stirred for 5 hours after which sufficient ferrous sulfate is added to neutralize the excess peroxide. The mixture is then acidified with hydrochloric acid and the organic solvent evaporated off. The water solution remaining is made basic and extracted with chloroform. The chloroform is evaporated off yielding 3'-(4-pyridyl)-spiro-[2,3-dihydro-1-benzothiepine-4,2'-oxirane]-5(4H)-one.

Following the procedure of step B of Example 4, the above 3'-(4-pyridyl)-spiro[2,3-dihydro-1-benzothiepine-4,2'-oxirane]-5(4H)-one is treated with hydrazine to yield 4,5-dihydro-3-(4-pyridyl) - 2H[1] - benzothiepino[5,4-c]-pyrazole.

EXAMPLE 7

4,5-dihydro-3-(4-pyridyl)-2H[1]-benzothiepino-[5,4-c]-pyrazole

Into a flask equipped with a magnetic stirring bar is charged 5.0 grams of 3-(4-pyridyl)3,3a,4,5-tetrahydro-2H[1]-benzothiepino[5,4-c]-pyrazole prepared as described in example 1 before the chromatography step, 25 grams of activated manganese dioxide and 150 ml. of dry benzene. The mixture is stirred 12 hours at room temperature and then filtered. The solvent is removed and the solid title product is crystallized from ethanol.

What is claimed is:

1. A compound of the formula

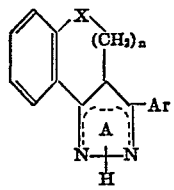

where ring A represents the structures

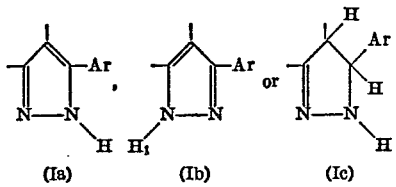

$n$ is 1 or 2
$X$ is S and
Ar is

or a pharmaceutically acceptable acid addition salt thereof.

2. The compound of claim 1 in which ring A has the structure (Ia) or (Ib) and Ar is 4-pyridyl.
3. The compounds of claim 1 in which $n$ is 1.
4. The compounds of claim 1 in which $n$ is 2.
5. The compound of claim 2 which is 4,5-dihydro-3-(4-pyridyl)-2H[1]-benzothiepino[5,4-c]-pyrazole.

References Cited
UNITED STATES PATENTS

| 3,235,654 | 2/1966 | Wagner | 260—310 R |
| 3,624,102 | 11/1971 | Brown et al. | 260—310 R |

ALAN L. ROTMAN, Primary Examiner

U.S. Cl. X.R.

260—296 T, 310 R, 297 B, 327 B, 333, 345.2; 424—263, 269